US012663986B2

(12) United States Patent
Mashhadi Kalimi et al.

(10) Patent No.: US 12,663,986 B2
(45) Date of Patent: Jun. 23, 2026

(54) CENTRAL PACKAGE MANAGEMENT (CPM) ACROSS CODE REPOSITORIES

(71) Applicant: Microsoft Technology Licensing, LLC, Redmond, WA (US)

(72) Inventors: Eliyahu Mashhadi Kalimi, Netanya (IL); Roei Shlomo Menashof, Netanya (IL); David Mansour, Yehud (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 440 days.

(21) Appl. No.: 18/300,356

(22) Filed: Apr. 13, 2023

(65) Prior Publication Data

US 2024/0345833 A1     Oct. 17, 2024

(51) Int. Cl.
*G06F 16/16* (2019.01)
*G06F 8/36* (2018.01)
*G06F 8/71* (2018.01)
*G06F 16/13* (2019.01)
*G06F 16/55* (2019.01)

(52) U.S. Cl.
CPC . *G06F 8/71* (2013.01); *G06F 8/36* (2013.01)

(58) Field of Classification Search
CPC ..................................... G06F 8/71; G06F 8/36
See application file for complete search history.

(56) References Cited

U.S. PATENT DOCUMENTS

2006/0059253 A1*  3/2006  Goodman .............. G06Q 10/10
709/223

2012/0144378 A1    6/2012  Shah et al.
2015/0199411 A1*   7/2015  Greenspan ............ G06F 40/197
715/764

(Continued)

FOREIGN PATENT DOCUMENTS

CN        112558980 A       3/2021
CN        112835568 A       5/2021

(Continued)

OTHER PUBLICATIONS

"Central Package Management Microsoft Learn, " Retrieve from: https://web.archive.org/web/20230329144913/https://learn.microsoft. com/en-us/nuget/consume-packages/central-package-management, Mar. 29, 2023, pp. 1-7.

(Continued)

*Primary Examiner* — S. Sough
*Assistant Examiner* — Mohammad H Kabir
(74) *Attorney, Agent, or Firm* — Foley IP Law, PLLC

(57) ABSTRACT

Central package management (CPM) across code repositories is disclosed. In an example, a primary "props" file in a Git submodule references a version of a NuGet package. A ".props" file in a root directory of each of multiple code repositories references the primary props file in the Git submodule. Each of multiple software projects in the code repositories has a package reference to the NuGet package without a reference to the version of the NuGet package. When each of the multiple the software projects is built (e.g., compiled), the build process automatically uses the version of the NuGet package that is identified in the Git submodule. This permits a single change to the version number of the NuGet package in the Git submodule to be propagated across multiple projects spanning multiple code repositories.

20 Claims, 7 Drawing Sheets

(56) References Cited

U.S. PATENT DOCUMENTS

| | | | |
|---|---|---|---|
| 2016/0321055 A1 | 11/2016 | Mihalcea et al. | |
| 2021/0026804 A1 | 1/2021 | Kothari et al. | |
| 2022/0327097 A1* | 10/2022 | Wong | G06F 16/55 |

FOREIGN PATENT DOCUMENTS

| | | | | |
|---|---|---|---|---|
| CN | 113138790 A | * | 7/2021 | G06F 11/3628 |
| CN | 114153473 A | | 3/2022 | |
| CN | 108897547 B | | 4/2022 | |

OTHER PUBLICATIONS

International Search Report and Written Opinion received for PCT Application No. PCT/US2024/021253, Jun. 14, 2024, 14 pages.

Manaswini, Das., "Managing Git projects with submodules and subtrees," https://opensource.com/article/20/5/git-submodules-subtrees, May 6, 2020, pp. 1-12.

Douglas, et al., "Central Package Management (CPM)", Retrieved from: https://learn.microsoft.com/he-il/nuget/consume-packages/central-package-management, Feb. 3, 2023, 6 Pages.

Hogenson, et al., "Customize your build", Retrieved From: https://learn.microsoft.com/en-US/visualstudio/msbuild/customize-your-build?view=vs-2022, Mar. 31, 2023, 3 Pages.

Kikas, et al., "Structure and Evolution of Package Dependency Networks", In Proceedings of IEEE/ACM 14th International Conference on Mining Software Repositories (MSR), Jul. 3, 2017, pp. 102-112.

Palma, Goncalo, "Dependency Manager—An Approach to Multiple Repositories in Flutter", Retrieved From: https://gpalma.pt/blog/dependency_manager/, Retrieved Date: Apr. 4, 2023, 15 Pages.

Persson, Oskar, "Exploring methods for Dependency Management in Multi-Repositories: Design Science Research at Saab Training and Simulation", In Thesis Submitted to School of Engineering at Jonkoping University, Jul. 15, 2021, 48 Pages.

Savkin, Victor, "Dev Workflow Using Git Submodules and Yarn Workspaces", In Publication of Nx Devtools, Jan. 23, 2018, 6 Pages.

Wim, "Grouping multiple repositories with git submodules", Retrieved From: https://www.jdev.it/grouping-multiple-repositories-with-git-submodules/, Dec. 31, 2021, 3 Pages.

International Preliminary Report on Patentability (Chapter I) received for PCT Application No. PCT/US2024/021253, mailed on Oct. 23, 2025, 09 pages.

* cited by examiner

FIG. 2A

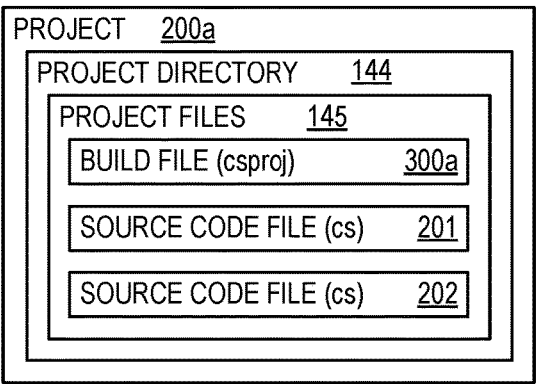

PROJECT    200a
PROJECT DIRECTORY    144
PROJECT FILES    145
BUILD FILE (csproj)    300a
SOURCE CODE FILE (cs)    201
SOURCE CODE FILE (cs)    202

FIG. 2B

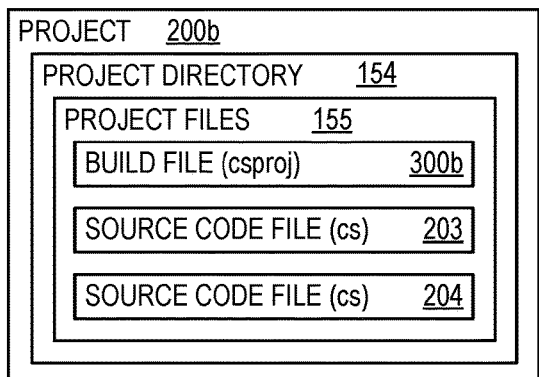

PROJECT    200b
PROJECT DIRECTORY    154
PROJECT FILES    155
BUILD FILE (csproj)    300b
SOURCE CODE FILE (cs)    203
SOURCE CODE FILE (cs)    204

Project_200a_Build_File.csproj

```
                                                          300a
<Project Sdk="project_filename">
  <PropertyGroup>
    <TargetFramework>framework1.0</TargetFramework>
  </PropertyGroup>
  <ItemGroup>              306              308
    <PackageReference Include="included_software_package" />
  </ItemGroup>
</Project>
```

FIG. 4A

Directory.Packages.props   ←402   ←404

```
                                                          400a
<Project>
  <PropertyGroup>                            ←406
    <ManagePackageVersionsCentrally>true</ManagePackageVersionsCentrally>
  </PropertyGroup>                                        ←408
  <Import Project="CPM_submodel\Directory.Packages.props" />
</Project>
```

FIG. 4B

Directory.Packages.props   ←402   ←404

```
                                                          400b
<Project>
  <PropertyGroup>                            ←406
    <ManagePackageVersionsCentrally>true</ManagePackageVersionsCentrally>
  </PropertyGroup>                                        ←408
  <Import Project="CPM_submodel\Directory.Packages.props" />
</Project>
```

FIG. 5

←512   ←502   ←504
CPM_submodel\Directory.Packages.props

```
                                                          500
<Project>
  <PropertyGroup>                            ←506
    <ManagePackageVersionsCentrally>true</ManagePackageVersionsCentrally>
  </PropertyGroup>
  <ItemGroup>                            ←508          ←510
    <PackageVersion Include="included_software_package" Version="1.0" />
  </ItemGroup>
</Project>
```

602
```
REPOSITORY 140
|-- Reference -> Directory.Packages.props
|-- Solution1
    |-- PROJECT 200a
|-- Solution2
    |-- PROJECT 200c
```

604
```
REPOSITORY 150
|-- Referencl -> Directory.Packages.props
|-- Solution3
    |-- PROJECT 200b
```

606
```
REPOSITORY SUBMODULE 131
CPM_submodule (directory)                500
|-- Directory.Packages.props (file)
```

FIG. 7

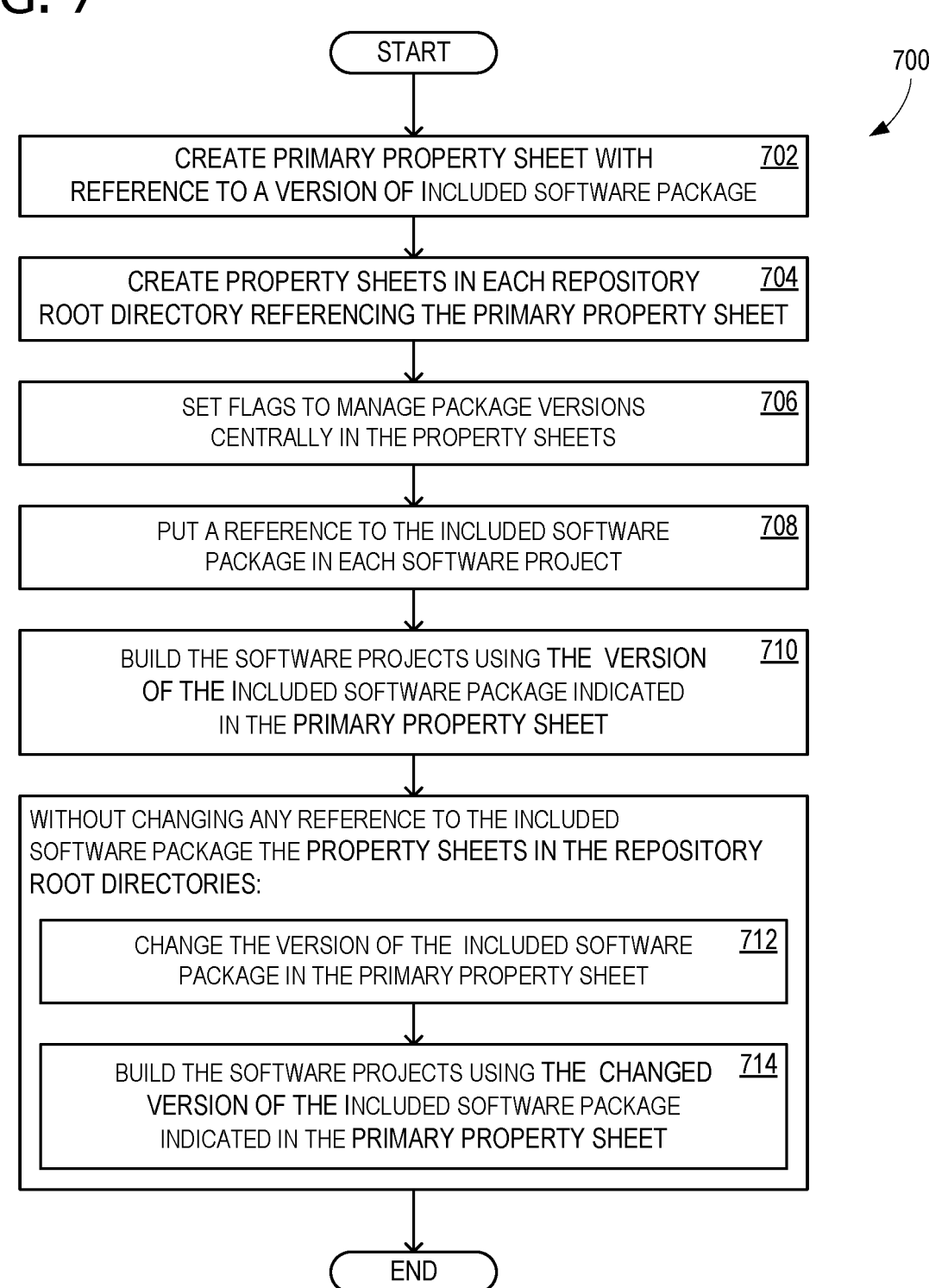

START

CREATE PRIMARY PROPERTY SHEET WITH          702
REFERENCE TO A VERSION OF INCLUDED SOFTWARE PACKAGE

CREATE PROPERTY SHEETS IN EACH REPOSITORY          704
ROOT DIRECTORY REFERENCING THE PRIMARY PROPERTY SHEET

SET FLAGS TO MANAGE PACKAGE VERSIONS          706
CENTRALLY IN THE PROPERTY SHEETS

PUT A REFERENCE TO THE INCLUDED SOFTWARE          708
PACKAGE IN EACH SOFTWARE PROJECT

BUILD THE SOFTWARE PROJECTS USING THE VERSION          710
OF THE INCLUDED SOFTWARE PACKAGE INDICATED
IN THE PRIMARY PROPERTY SHEET

WITHOUT CHANGING ANY REFERENCE TO THE INCLUDED
SOFTWARE PACKAGE THE PROPERTY SHEETS IN THE REPOSITORY
ROOT DIRECTORIES:

CHANGE THE VERSION OF THE INCLUDED SOFTWARE          712
PACKAGE IN THE PRIMARY PROPERTY SHEET

BUILD THE SOFTWARE PROJECTS USING THE CHANGED          714
VERSION OF THE INCLUDED SOFTWARE PACKAGE
INDICATED IN THE PRIMARY PROPERTY SHEET

END

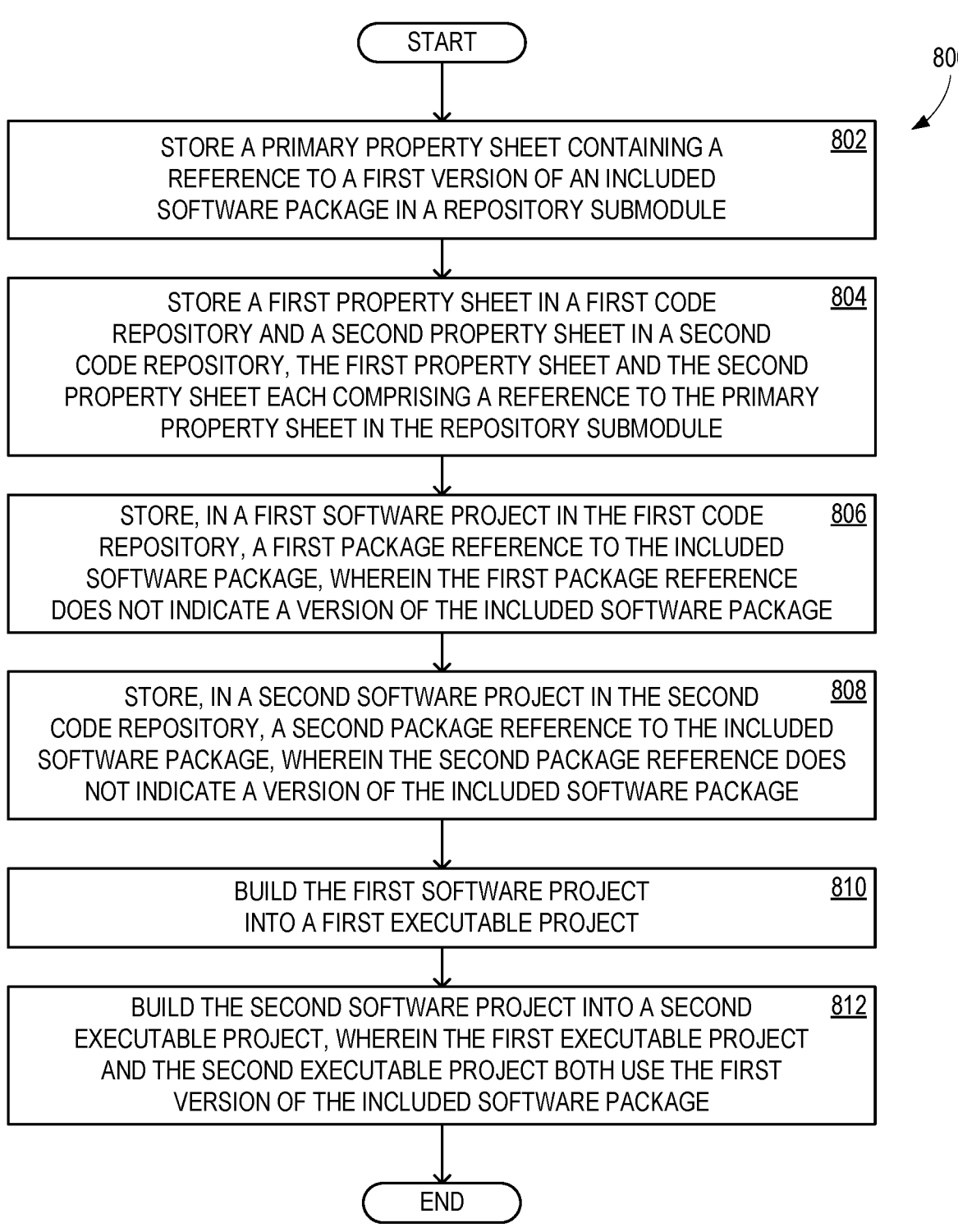

START

800

STORE A PRIMARY PROPERTY SHEET CONTAINING A REFERENCE TO A FIRST VERSION OF AN INCLUDED SOFTWARE PACKAGE IN A REPOSITORY SUBMODULE          802

STORE A FIRST PROPERTY SHEET IN A FIRST CODE REPOSITORY AND A SECOND PROPERTY SHEET IN A SECOND CODE REPOSITORY, THE FIRST PROPERTY SHEET AND THE SECOND PROPERTY SHEET EACH COMPRISING A REFERENCE TO THE PRIMARY PROPERTY SHEET IN THE REPOSITORY SUBMODULE          804

STORE, IN A FIRST SOFTWARE PROJECT IN THE FIRST CODE REPOSITORY, A FIRST PACKAGE REFERENCE TO THE INCLUDED SOFTWARE PACKAGE, WHEREIN THE FIRST PACKAGE REFERENCE DOES NOT INDICATE A VERSION OF THE INCLUDED SOFTWARE PACKAGE          806

STORE, IN A SECOND SOFTWARE PROJECT IN THE SECOND CODE REPOSITORY, A SECOND PACKAGE REFERENCE TO THE INCLUDED SOFTWARE PACKAGE, WHEREIN THE SECOND PACKAGE REFERENCE DOES NOT INDICATE A VERSION OF THE INCLUDED SOFTWARE PACKAGE          808

BUILD THE FIRST SOFTWARE PROJECT INTO A FIRST EXECUTABLE PROJECT          810

BUILD THE SECOND SOFTWARE PROJECT INTO A SECOND EXECUTABLE PROJECT, WHEREIN THE FIRST EXECUTABLE PROJECT AND THE SECOND EXECUTABLE PROJECT BOTH USE THE FIRST VERSION OF THE INCLUDED SOFTWARE PACKAGE          812

END

CENTRAL PACKAGE MANAGEMENT (CPM) ACROSS CODE REPOSITORIES

BACKGROUND

Software developers typically leverage prior-existing software components, such as packages (e.g., NuGet packages) in the development of large software projects. However, absent some standardization scheme, different developers, authoring different portions of a project's source code at different times, run the risk of using different, and possibly incompatible, versions of a package to be included in a project. This is often due to different versions of some given package becoming available at different times during the life cycle of some project. For example, when a first project is first started, a package may be available only as version 1.0. Later, when portions of that first project are copied into a newer second project, the package may be available as version 1.1. If developers identify the specific version to use within the source code files, different source code files may each specify different versions of the same included package. In some scenarios, this may create performance or reliability issues.

Central package management (CPM) alleviates this risk by centralizing package management in a single location— for software projects residing fully within a single code repository. CPM is able to function across projects that are all within a single code repository, by using a Directory. Packages. props file and an MSBuild property.

SUMMARY

The disclosed examples are described in detail below with reference to the accompanying drawing figures listed below. The following summary is provided to illustrate some examples disclosed herein.

Example solutions for providing central package management (CPM) across code repositories include: storing a primary property sheet (e.g., a ".props" file) containing a reference to a first version of an included software package (e.g., a NuGet package) into a repository submodule (e.g., a Git submodule); storing a first property sheet into a first code repository and a second property sheet into a second code repository, the first property sheet and the second property sheet each comprising a reference to the primary property sheet in the repository submodule; storing, in a first software project in the first code repository, a first package reference to the included software package, wherein the first package reference does not indicate a version of the included software package; storing, in a second software project in the second code repository, a second package reference to the included software package, wherein the second package reference does not indicate a version of the included software package; building (e.g., compiling) the first software project into a first executable project; and building the second software project into a second executable project, wherein the first executable project and the second executable project both use the first version of the included software package.

BRIEF DESCRIPTION OF THE DRAWINGS

The disclosed examples are described in detail below with reference to the accompanying drawing figures listed below:

FIGS. 2A and 2B illustrate exemplary software projects, such as may be used in the example architecture of FIG. 1;

FIG. 3 illustrates an exemplary build file, such as may be used in the example projects of FIGS. 2A and 2B;

FIGS. 4A and 4B illustrate exemplary property sheets, such as may be used in the example architecture of FIG. 1;

FIG. 5 illustrates an exemplary repository submodule (primary) property sheet, such as may be used in the example architecture of FIG. 1;

FIG. 6 illustrates an exemplary repository file hierarchy, such as may be used in the example architecture of FIG. 1;

FIGS. 7 and 8 show flowcharts illustrating exemplary operations that may be performed when using example architectures, such as the architecture of FIG. 1.

Corresponding reference characters indicate corresponding parts throughout the drawings.

DETAILED DESCRIPTION

Figure 1:
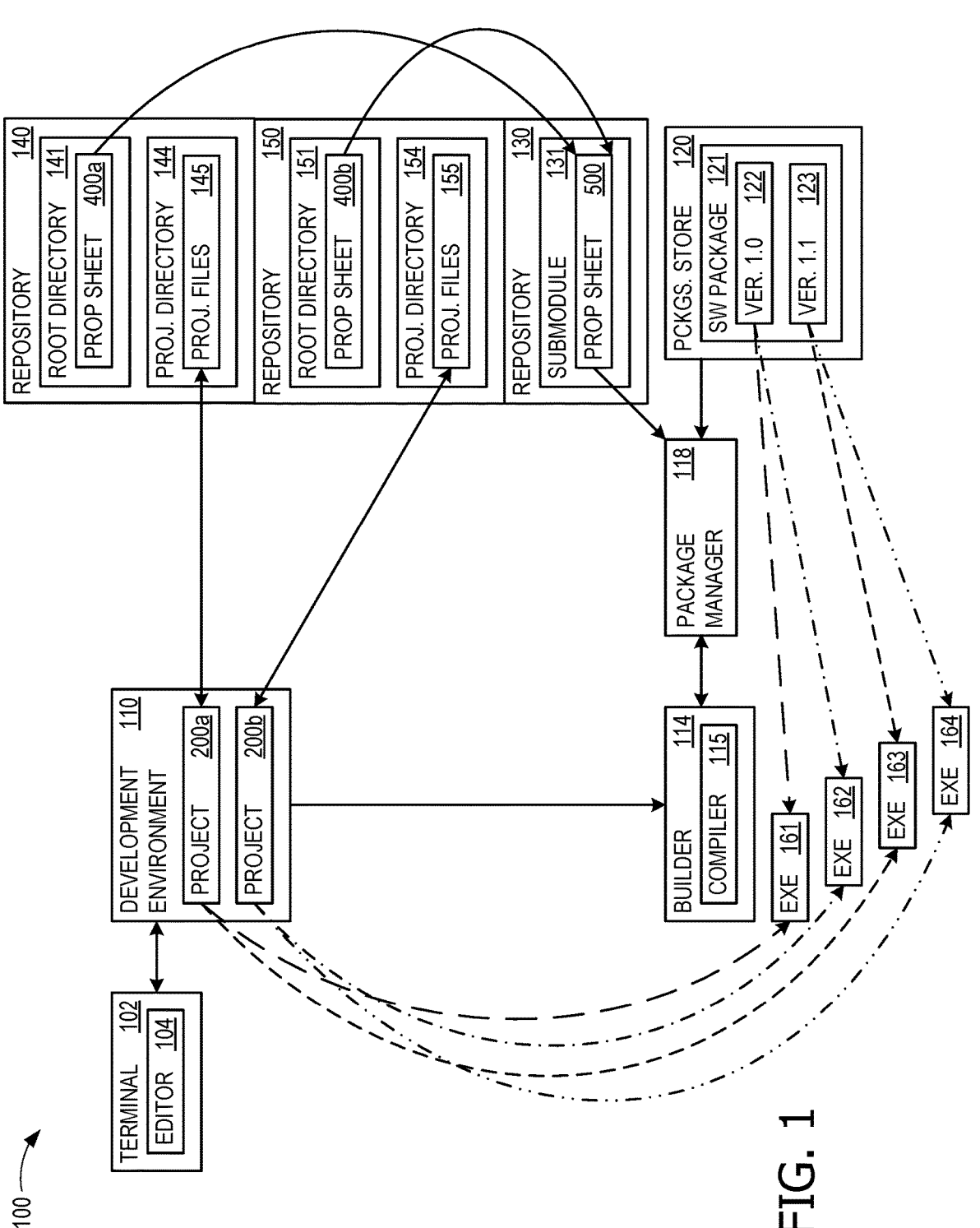
FIG. 1 illustrates an example architecture that advantageously provides for central package management (CPM) across code repositories.

Software developers may use different code repositories, and central package management (CPM) does not function across code repositories. This leads to a risk of performance or reliability issues, similar to those that CPM purportedly resolves. That is, the touted benefits of CPM fail whenever software projects span multiple code repositories or a developer uses multiple code repositories.

Example solutions for providing central package management across code repositories include: storing a primary property sheet (e.g., a ".props" file) containing a reference to a first version of an included software package (e.g., a NuGet package) in a repository submodule (e.g., a Git submodule); storing a first property sheet in a first code repository and a second property sheet in a second code repository, the first property sheet and the second property sheet each comprising a reference to the primary property sheet in the repository submodule; storing, in a first software project in the first code repository, a first package reference to the included software package, wherein the first package reference does not indicate a version of the included software package; storing, in a second software project in the second code repository, a second package reference to the included software package, wherein the second package reference does not indicate a version of the included software package; building (e.g., compiling) the first software project into a first executable project; and building the second software project into a second executable project, wherein the first executable project and the second executable project both use the first version of the included software package.

In an example, a primary ".props" file in a Git submodule references a version of a NuGet package. A ".props" file in a root directory of each of multiple code repositories references the primary props file in the Git submodule. Each of multiple software projects in the code repositories has a package reference to the NuGet package without a reference to the version of the NuGet package. When each of the multiple the software projects is built (e.g., compiled), the build process automatically uses the version of the NuGet package that is identified in the Git submodule. This permits a single change to the version number of the NuGet package in the Git submodule to be propagated across multiple projects spanning multiple code repositories.

The example solutions described herein improves the reliability of computing operations by minimizing the risk of software projects spanning different code repositories using different versions of included software packages. Examples accomplish these advantageous performance benefits by at least storing a primary property sheet containing a reference to a first version of an included software package in a repository submodule; and storing a first property sheet in a first code repository and a second property sheet in a second code repository, the first property sheet and the second property sheet each comprising a reference to the primary property sheet in the repository submodule.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

FIG. 1 illustrates an example architecture 100 that advantageously provides for CPM across code repositories 140 and 150. In architecture 100, a user terminal 102 with a code editor 104 accesses a development environment 110 to perform development on a software project 200a and a software project 200b. In some examples, code editor 104 is not within user terminal 102, but instead is part of development environment 110 across a computer network. In some examples, development environment 110 is local to user terminal 102, whereas in other examples, development environment 110 is located on another compute node remote across a computer network from user terminal 102.

Software project 200a uses a code repository 140, for example a Git repository, to store a set of project files 145 in a project directory 144. In some examples, code repository 140 is remote across a computer network from development environment 110, whereas in other examples, there is a copy of code repository 140 local to development environment 110. In some examples, set of project files 145 spans multiple project directories 144 and/or sub-directories, and in some examples, set of project files 145 spans multiple code repositories (i.e., one portion of set of project files 145 is within code repository 140, while another portion of set of project files 145 is within a code repository 150).

Software project 200b may be similar, using code repository 150 to store a set of project files 155 in a project directory 154. Software projects 200a and 200b may be programed with a high level language source code, such as a C-based (e.g., C #, C++), or BASIC (e.g., Visual Basic), python, Javascript, or another language. Software projects 200a and 200b are illustrated in further detail in FIGS. 2A and 2B, respectively.

Code repository 140 has a root directory 141 holding a property sheet 400a. In some examples, property sheet 400a is an extensible markup language (XML) file and has a filename extension "props". In some examples, property sheet 400a is named "Directory.Packages.props". Similarly, code repository 150 has a root directory 151 holding a property sheet 400b, which may be similar or identical to property sheet 400a. Property sheets 400a and 400b both have a reference to a primary property sheet 500 in a repository submodule 131. Property sheets 400a and 400b are illustrated in further detail in FIGS. 4A and 4B, respectively.

Repository submodule 131 is a directory within a repository 130, which in some examples, is a directory within code repository 140 or 150, or it may be located elsewhere. Repository submodule 131 contains primary property sheet 500, which is illustrated in further detail in FIG. 5. In some examples, primary property sheet 500 is an XML file and is named "Directory.Packages.props" with a filename extension "props".

Primary property sheet 500 contains a reference to a version of an included software package 121 within a package store 120. Included software package 121 will be included within the executable build of software projects 200a and 200b. As shown, there is a version 122 (identified as "version 1.0") and a version 123 (identified as "version 1.1") of included software package 121 within package store 120. The executable build of software projects 200a and 200b will use the version (e.g., version 122 or version 123) of included software package 121 that is specified in primary property sheet 500, even though no version is specified within software projects 200a and 200b themselves or within property sheet 400a or 400b.

By changing the identified version of included software package 121 within only a single location i.e., primary property sheet 500, the change propagates across code repositories 140 and 150. This is because, as shown below, software project 200a references included software package 121 without identifying the specific version, and instead defers to the version identified within property sheet 400a. But property sheet 400a itself also does not identify the specific version of included software package 121, and instead defers to the version identified within primary property sheet 500. Similarly, software project 200b references included software package 121 without identifying the specific version, and instead defers to the version identified within property sheet 400b. Property sheet 400b itself also does not identify the specific version of included software package 121, and instead defers to the version identified within primary property sheet 500.

A builder 114, which in some examples includes a compiler 115, builds executable versions of software projects 200a and 200b, for example executable projects 161-164. Some languages, such as C-based languages require compilation. In such examples, included software package 121 may also be in a high level source code form, or may have already been compiled onto object code (or an equivalent), and merely requires linking. Builder 114 uses a package manager 118 to pull the identified version of included software package 121 into the build process.

As indicated, executable project 161 is the executable version of software project 200a and uses version 122 (e.g., "version 1.0") of included software package 121; executable project 162 is the executable version of software project 200b and also uses version 122 of included software package 121; executable project 163 is the executable version of software project 200a and uses version 123 (e.g., "version 1.1") of included software package 121; and executable project 164 is the executable version of software project 200b and uses version 123 of included software package 121.

FIGS. 2A and 2B illustrate further detail for software projects 200a and 200b, respectively. In FIGS. 2A, software project 200a is shown as having a project directory 144, which has a version within code repository 140, and may also exist as a local copy within development environment 110 and/or user terminal 102. Project directory 144 contains project files 145, which comprises a build file 300a, a source code file 201, and a source code file 202. In FIGS. 2B, software project 200b is shown as having a project directory 154, which has a version within code repository 150, and may also exist as a local copy within development environment 110 and/or user terminal 102. Project directory 154 contains project files 155, which comprises a build file 300b, a source code file 203, and a source code file 204. In C #
projects, build files 300*a* and 300*b* may have an extension
"csproj", which indicates C # (c sharp) project. Additionally,
source code files 201-204 may have "cs" file extensions,
indicating C #. Other languages may use different exten-
sions, such as a C++ project may use a "cpp" extension for
source code files 201-204.

FIG. 3 illustrates an example of build file 300*a*. Build file
300*b* has similar or equivalent contents. Build file 300*a* has
a filename 302 of "Project_200a_Build_File.csproj", in
which an extension 304 is "csproj". For build file 300*b*,
filename 302 is "Project_200b_Build_File.csproj", with the
same extension 304. Build file 300*a* has package reference
306 to included software package 121, using an indication
308 of "included_software_package" that does not indicate
a version of included software package 121. Build file 300*b*
has an equivalent (or same) package reference 306.

FIGS. 4A and 4B illustrate examples of property sheets
400*a* and 400*b*. As shown in FIG. 4A, property sheet 400*a*
has a filename 402 of "Directory.Packages.props", in which
an extension 404 is "props". A build property 406 is set to
"true", which is a flag to manage package versions centrally.
During the build process of software project 200*a*, builder
114 will detect that build property 406 is set to manage
package versions centrally. Property sheet 400*a* also has a
reference 408 to primary property sheet 500 in repository
submodule 131, using a filename 502 of primary property
sheet 500 and a path 512 to repository submodule 131 (see
FIG. 5).

Similarly, in FIG. 4B, property sheet 400*b* has the same
filename 402 of "Directory.Packages.props", with extension
404 as "props", and build property 406 is set to "true" to
manage package versions centrally. During the build process
of software project 200*b*, builder 114 will detect that build
property 406 is set to manage package versions centrally.
Property sheet 400*b* also has a reference 408 to primary
property sheet 500 in repository submodule 131.

FIG. 5 illustrates an example of primary property sheet
500 in repository submodule 131. Primary property sheet
500 has filename 502 set to "Directory.Packages.props",
with a file extension 504 of "props", and path 512 to
repository submodule 131. In some examples, path 512 will
be longer, such as to indicate an address of another code
repository. A build property 506 is set to "true", to manage
package versions centrally. During the build process of
software project 200*a*, after having been directed to primary
property sheet 500 via reference 408, builder 114 will detect
that build property 506 is set to manage package versions
centrally. Primary property sheet 500 also has a reference
508 to included software package 121 that has an indication
510 of the specific version of included software package 121
to use.

In an example operation, indication 510 is initially set to
version 122 ("version 1.0"), and builder 114 builds software
project 200*a* into executable project 161 and builds software
project 200*b* into executable project 162 using version 122
of included software package 121 for both. Without chang-
ing any of reference 408, package reference 306, or indica-
tion 308, if only indication 510 is changed to version 123
("version 1.1), builder 114 builds software project 200*a* into
executable project 163 and builds software project 200*b* into
executable project 164 using version 123 of included soft-
ware package 121 for both.

FIG. 6 illustrates an exemplary repository file hierarchy
600. In code repository 140, property sheet 400*a* is gener-
alized as reference 602 to primary property sheet 500, and
property sheet 400*b* in code repository 150 is generalized as a reference 604 to primary property sheet 500. A directory
606, named "CPM_submodule" matches at least a portion of
path 512 of FIG. 5, and holds primary property sheet 500.
During build, both software project 200*a* and another soft-
ware project 200*c* within code repository 140 will use
package versions indicated by reference 602 (which, in turn,
references primary property sheet 500), because those soft-
ware projects are within code repository 140. Similarly,
software project 200*b* within code repository 150 will use
package versions indicated by reference 604 (which, in turn,
references primary property sheet 500), because it is within
code repository 150.

FIG. 7 shows a flowchart 700 illustrating exemplary
operations that may be performed by architecture 100. In
some examples, operations described for flowchart 700 are
performed by computing device 900 of FIG. 9. Flowchart
700 commences with creating primary property sheet 500
with reference 508 to version 122 of included software
package 121 in repository submodule 131, in operation 702.

Operation 704 creates property sheet 400*a* in code reposi-
tory 140 and property sheet 400*b* in code repository 150.
Property sheets 400*a* and 400*b* in each repository root
directory comprises reference 408 to primary property sheet
500 in repository submodule 131. In some examples, prop-
erty sheet 400*a* is located within root directory 141 of code
repository 140 and property sheet 400*b* is located within root
directory 151 of code repository 150. Operation 706 sets
flags, e.g., build properties 406 and 506 in property sheets
400*a* and 400*b*, and primary property sheet 500, to manage
package versions centrally.

Operation 708 stores package reference 306 to included
software package 121 in software project 200*a* in code
repository 140 and also stores package reference 306 in
software project 200*b* in code repository 150. Package
reference 306 does not indicate a version of included soft-
ware package 121 in either of software project 200*a* or
software project 200*b*. Operation 710 builds software proj-
ect 200*a* into executable project 161 and builds software
project 200*b* into executable project 162 using the version of
the included software package indicated in the primary
property sheet. For example, executable projects 161 and
162 both use version 122 of included software package 121.

Operations 712 and 714 are performed without changing
any reference to included software package 121 in the
property sheets in the repository root directories of either
software project 200*a* or software project 200*b*. Operation
712 changes reference 508 from version 122 of included
software package 121 to version 123 of included software
package 121 in primary property sheet 500. Operation 714
builds software project 200*a* into executable project 163 and
builds software project 200*b* into executable project 164.
Executable projects 163 and 164 both use version 123 of
included software package 121.

FIG. 8 shows a flowchart 800 illustrating exemplary
operations that may be performed by architecture 100. In
some examples, operations described for flowchart 800 are
performed by computing device 900 of FIG. 9. Flowchart
800 commences with operation 802 which includes storing
a primary property sheet containing a reference to a first
version of an included software package in a repository
submodule. Operation 804 includes storing a first property
sheet in a first code repository and a second property sheet
in a second code repository, the first property sheet and the
second property sheet each comprising a reference to the
primary property sheet in the repository submodule.

Operation 806 includes storing, in a first software project
in the first code repository, a first package reference to the included software package, wherein the first package reference does not indicate a version of the included software package. Operation 808 includes storing, in a second software project in the second code repository, a second package reference to the included software package, wherein the second package reference does not indicate a version of the included software package. Operation 810 includes building the first software project into a first executable project. Operation 812 includes building the second software project into a second executable project, wherein the first executable project and the second executable project both use the first version of the included software package.

ADDITIONAL EXAMPLES

An example system comprises: a processor; and a computer-readable medium storing instructions that are operative upon execution by the processor to: store a primary property sheet containing a reference to a first version of an included software package in a repository submodule; store a first property sheet in a first code repository and a second property sheet in a second code repository, the first property sheet and the second property sheet each comprising a reference to the primary property sheet in the repository submodule; store, in a first software project in the first code repository, a first package reference to the included software package, wherein the first package reference does not indicate a version of the included software package; store, in a second software project in the second code repository, a second package reference to the included software package, wherein the second package reference does not indicate a version of the included software package; build the first software project into a first executable project; and build the second software project into a second executable project, wherein the first executable project and the second executable project both use the first version of the included software package.

An example computer-implemented method comprises: storing a primary property sheet containing a reference to a first version of an included software package in a repository submodule; storing a first property sheet in a first code repository and a second property sheet in a second code repository, the first property sheet and the second property sheet each comprising a reference to the primary property sheet in the repository submodule; storing, in a first software project in the first code repository, a first package reference to the included software package, wherein the first package reference does not indicate a version of the included software package; storing, in a second software project in the second code repository, a second package reference to the included software package, wherein the second package reference does not indicate a version of the included software package; building the first software project into a first executable project; and building the second software project into a second executable project, wherein the first executable project and the second executable project both use the first version of the included software package.

One or more example computer storage devices have computer-executable instructions stored thereon, which, on execution by a computer, cause the computer to perform operations comprising: storing a primary property sheet containing a reference to a first version of an included software package in a repository submodule; storing a first property sheet in a first code repository and a second property sheet in a second code repository, the first property sheet and the second property sheet each comprising a reference to the primary property sheet in the repository submodule; storing, in a first software project in the first code repository, a first package reference to the included software package, wherein the first package reference does not indicate a version of the included software package; storing, in a second software project in the second code repository, a second package reference to the included software package, wherein the second package reference does not indicate a version of the included software package; building the first software project into a first executable project; and building the second software project into a second executable project, wherein the first executable project and the second executable project both use the first version of the included software package.

Alternatively, or in addition to the other examples described herein, examples include any combination of the following:

setting a build property to manage package versions centrally;

without changing any reference to the included software package in either the first software project or the second software project: changing, in the primary property sheet, the reference from the first version of the included software package to a second version of the included software package; building the first software project into a third executable project; and building the second software project into a fourth executable project, wherein the third executable project and the fourth executable project both use the second version of the included software package;

the first property sheet is located within a root directory of the first code repository and the second property sheet is located within a root directory of the second code repository;

the first software project and the second software project each comprises a file containing high level language source code;

each of the primary property sheet, the first property sheet, and the second property sheet comprises an XML file;

a filename of each of the primary property sheet, the first property sheet, and the second property sheet comprises a props extension;

the included software package comprises a NuGet package;

the repository submodule comprises a Git submodule;

the included software package comprises high level language source code;

the included software package comprises compiled software code;

building the first software project and the second software project comprises compiling source code of the first software project and the second software project; and the high level language source code is of a type selected from the group consisting of: BASIC, python, Javascript, and a C-based language.

While the aspects of the disclosure have been described in terms of various examples with their associated operations, a person skilled in the art would appreciate that a combination of operations from any number of different examples is also within scope of the aspects of the disclosure.

Example Operating Environment

Figure 9:
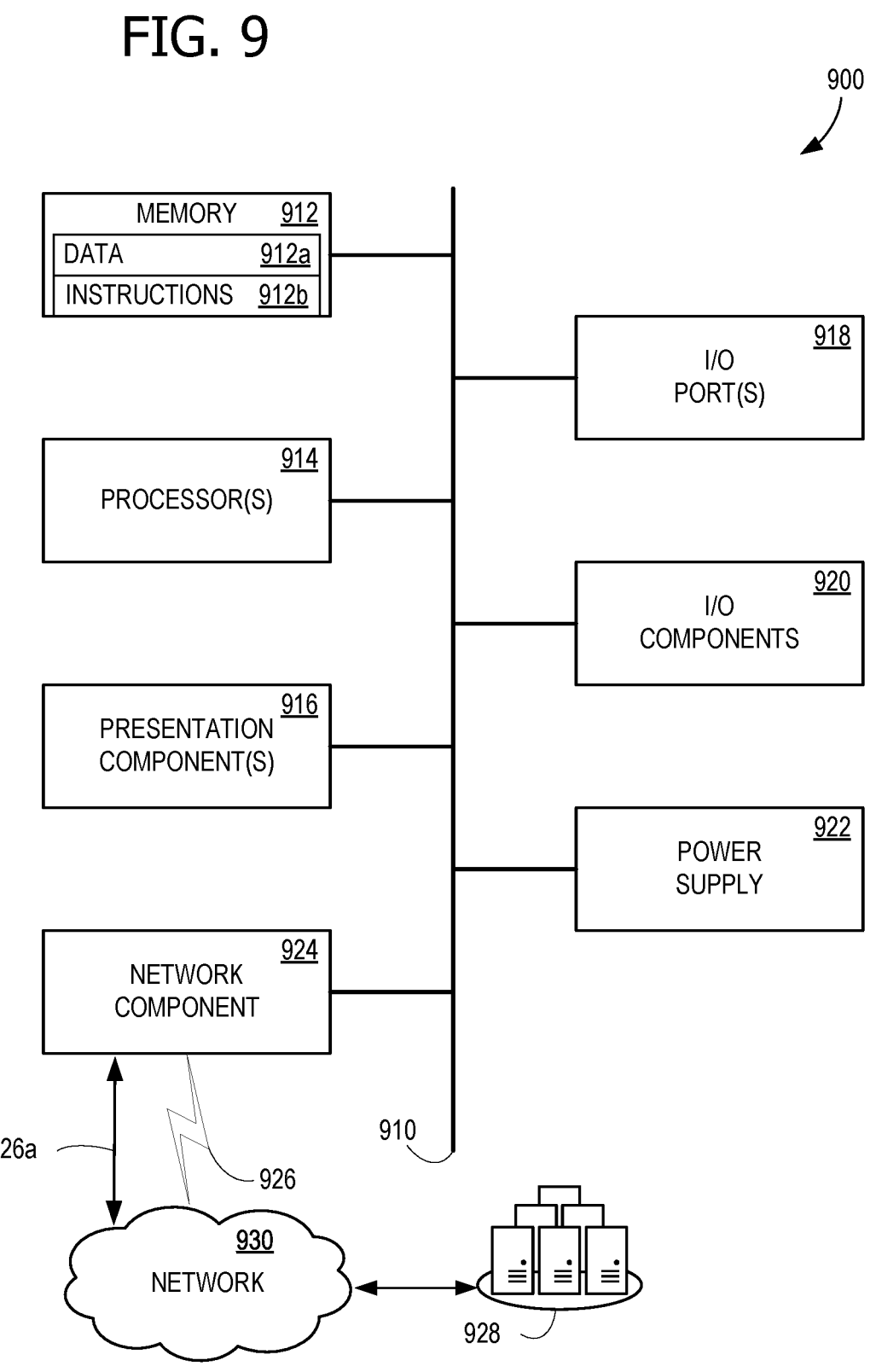
FIG. 9 shows a block diagram of an example computing device suitable for implementing some of the various examples disclosed herein.

FIG. 9 is a block diagram of an example computing device 900 (e.g., a computer storage device) for implementing aspects disclosed herein, and is designated generally as computing device 900. In some examples, one or more computing devices 900 are provided for an on-premises computing solution. In some examples, one or more computing devices 900 are provided as a cloud computing solution. In some examples, a combination of on-premises and cloud computing solutions are used. Computing device 900 is but one example of a suitable computing environment and is not intended to suggest any limitation as to the scope of use or functionality of the examples disclosed herein, whether used singly or as part of a larger set.

Neither should computing device 900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 900 includes a bus 910 that directly or indirectly couples the following devices: computer storage memory 912, one or more processors 914, one or more presentation components 916, input/output (I/O) ports 918, I/O components 920, a power supply 922, and a network component 924. While computing device 900 is depicted as a seemingly single device, multiple computing devices 900 may work together and share the depicted device resources. For example, memory 912 may be distributed across multiple devices, and processor(s) 914 may be housed with different devices.

Bus 910 represents what may be one or more busses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." Memory 912 may take the form of the computer storage media referenced below and operatively provide storage of computer-readable instructions, data structures, program modules and other data for the computing device 900. In some examples, memory 912 stores one or more of an operating system, a universal application platform, or other program modules and program data. Memory 912 is thus able to store and access data 912_a_ and instructions 912_b_ that are executable by processor 914 and configured to carry out the various operations disclosed herein.

In some examples, memory 912 includes computer storage media. Memory 912 may include any quantity of memory associated with or accessible by the computing device 900. Memory 912 may be internal to the computing device 900 (as shown in FIG. 9), external to the computing device 900 (not shown), or both (not shown). Additionally, or alternatively, the memory 912 may be distributed across multiple computing devices 900, for example, in a virtualized environment in which instruction processing is carried out on multiple computing devices 900. For the purposes of this disclosure, "computer storage media," "computer storage memory," "memory," and "memory devices" are synonymous terms for the memory 912, and none of these terms include carrier waves or propagating signaling.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within the computing device 900, or by a processor external to the client computing device 900. In some examples, the processor(s) 914 are programmed to execute instructions such as those illustrated in the flow charts discussed below and depicted in the accompanying drawings. Moreover, in some examples, the processor(s) 914 represent an implementation of analog techniques to perform the operations described herein. For example, the operations may be performed by an analog client computing device 900 and/or a digital client computing device 900. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. I/O ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

Computing device 900 may operate in a networked environment via the network component 924 using logical connections to one or more remote computers. In some examples, the network component 924 includes a network interface card and/or computer-executable instructions (e.g., a driver) for operating the network interface card. Communication between the computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 924 communicates over wireless communication link 926 and/or a wired communication link 926_a_ to a remote resource 928 (e.g., a cloud resource) across network 930. Various different examples of communication links 926 and 926_a_ include a wireless connection, a wired connection, and/or a dedicated link, and in some examples, at least a portion is routed through the internet.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor; and
a computer-readable medium storing instructions that are operative upon execution by the processor to:
store a primary property sheet containing a reference to a first version of an included software package in a repository submodule;
store a first property sheet in a first code repository and a second property sheet in a second code repository, the first property sheet and the second property sheet each comprising a reference to the primary property sheet in the repository submodule;
store, in a first software project in the first code repository, a first package reference to the included software package, wherein the first package reference does not indicate a version of the included software package;
store, in a second software project in the second code repository, a second package reference to the included software package, wherein the second package reference does not indicate a version of the included software package;
build the first software project into a first executable project;
build the second software project into a second executable project, wherein the first executable project and the second executable project both use the first version of the included software package;
without changing any reference to the included software package in either the first software project or the second software project, change, in the primary property sheet, the reference from the first version of the included software package to a second version of the included software package;
build the first software project into a third executable project; and
build the second software project into a fourth executable project, wherein the third executable project and the fourth executable project both use the second version of the included software package.

2. The system of claim 1, wherein the instructions are further operative to:

set a build property to manage package versions centrally.

3. The system of claim 1, wherein the first property sheet and the second property sheet do not identify a specific version of the included software package.

4. The system of claim 1, wherein the first property sheet is located within a root directory of the first code repository and the second property sheet is located within a root directory of the second code repository.

5. The system of claim 1, wherein the first software project and the second software project each comprises a file containing high level language source code.

6. The system of claim 1, wherein each of the primary property sheet, the first property sheet, and the second property sheet comprises an extensible markup language (XML) file.

7. The system of claim 1, wherein a filename of each of the primary property sheet, the first property sheet, and the second property sheet comprises a props extension;

wherein the included software package comprises a NuGet package; and wherein the repository submodule comprises a Git submodule.

8. A computer-implemented method comprising:

storing a primary property sheet containing a reference to a first version of an included software package in a repository submodule;

storing a first property sheet in a first code repository and a second property sheet in a second code repository, the first property sheet and the second property sheet each comprising a reference to the primary property sheet in the repository submodule, wherein the first property sheet and the second property sheet do not indicate a version of the included software package;

storing, in a first software project in the first code repository, a first package reference to the included software package, wherein the first package reference does not indicate a version of the included software package;

storing, in a second software project in the second code repository, a second package reference to the included software package;

building the first software project into a first executable project; and building the second software project into a second executable project, wherein the first executable project and the second executable project both use the first version of the included software package, and wherein building the first software project and the second software project comprises compiling source code;

without changing any reference to the included software package in either the first software project or the second software project, changing, in the primary property sheet, the reference from the first version of the included software package to a second version of the included software package;

building the first software project into a third executable project; and building the second software project into a fourth executable project, wherein the third executable project and the fourth executable project both use the second version of the included software package.

9. The computer-implemented method of claim 8, further comprising:

setting a build property to manage package versions centrally.

10. The computer-implemented method of claim 8, wherein the first property sheet and the second property sheet do not identify a specific version of the included software package.

11. The computer-implemented method of claim 8, wherein the first property sheet is located within a root directory of the first code repository and the second property sheet is located within a root directory of the second code repository.

12. The computer-implemented method of claim 8, wherein the first software project and the second software project each comprises a file containing high level language source code.

13. The computer-implemented method of claim 8, wherein each of the primary property sheet, the first property sheet, and the second property sheet comprises an extensible markup language (XML) file.

14. The computer-implemented method of claim 8, wherein a filename of each of the primary property sheet, the first property sheet, and the second property sheet comprises a props extension; wherein the included software package comprises a NuGet package; and wherein the repository submodule comprises a Git submodule.

15. A computer storage device having computer-executable instructions stored thereon, which, on execution by a computer, cause the computer to perform operations comprising:

storing a primary property sheet containing a reference to a first version of an included software package in a repository submodule, wherein the included software package comprises high level language source code;

storing a first property sheet in a first code repository and a second property sheet in a second code repository, the first property sheet and the second property sheet each comprising a reference to the primary property sheet in the repository submodule;

storing, in a first software project in the first code repository, a first package reference to the included software package, wherein the first package reference does not indicate a version of the included software package;

storing, in a second software project in the second code repository, a second package reference to the included software package, wherein the second package reference does not indicate a version of the included software package;

building the first software project into a first executable project; and building the second software project into a second executable project, wherein the first executable project and the second executable project both use the first version of the included software package;

without changing any reference to the included software package in either the first software project or the second software project, changing, in the primary property sheet, the reference from the first version of the included software package to a second version of the included software package;

building the first software project into a third executable project; and building the second software project into a fourth executable project, wherein the third executable project and the fourth executable project both use the second version of the included software package.

16. The computer storage device of claim 15, wherein the operations further comprise:

setting a build property to manage package versions centrally.

17. The computer storage device of claim 15, wherein the first property sheet and the second property sheet do not identify a specific version of the included software package.

18. The computer storage device of claim 15, wherein the first property sheet is located within a root directory of the first code repository and the second property sheet is located within a root directory of the second code repository.

19. The computer storage device of claim 15, wherein the first software project and the second software project each comprises a file containing high level language source code.

20. The computer storage device of claim 15, wherein each of the primary property sheet, the first property sheet, and the second property sheet comprises an extensible markup language (XML) file; wherein a filename of each of the primary property sheet, the first property sheet, and the second property sheet comprises a props extension; wherein the included software package comprises a NuGet package; and wherein the repository submodule comprises a Git submodule.

* * * * *